(12) United States Patent
Davies et al.

(10) Patent No.: US 6,474,175 B2
(45) Date of Patent: Nov. 5, 2002

(54) CORIOLIS MASS FLOWMETER WITH A CERAMIC MEASURING TUBE

(76) Inventors: Lawrence Davies, 58 Lower Pastures, Great Oakley, Nor Corby Northants NN 18 8 JJ (GB); Yousif Hussain, 25 Thornburn Road, Weston Favell, Northampton, NN3 3DA (GB); Chris N. Rolph, 2 Lodge Cottages, Salcey Lawn, Hartwell, Northampton (GB)

( * ) Notice: Subject to any disclaimer, the term of this patent is extended or adjusted under 35 U.S.C. 154(b) by 0 days.

(21) Appl. No.: 09/748,591

(22) Filed: Dec. 22, 2000

(65) Prior Publication Data

US 2001/0006007 A1 Jul. 5, 2001

(30) Foreign Application Priority Data

Dec. 27, 1999 (GB) .......................................... 199 62 858
Jan. 28, 2000 (GB) .......................................... 100 03 784

(51) Int. Cl.[7] ................................................. G01F 1/84
(52) U.S. Cl. ................................................. 73/861.357
(58) Field of Search ...................... 73/861.355, 861.356, 73/861.357

(56) References Cited

U.S. PATENT DOCUMENTS

| 5,027,662 A | * | 7/1991 | Titlow et al. | .......... 73/861.356 |
| 5,157,975 A | * | 10/1992 | Tanaka et al. | .......... 73/861.355 |
| 5,747,704 A | * | 5/1998 | Van Der Pol | .......... 73/861.357 |

FOREIGN PATENT DOCUMENTS

DE          41 19 396          8/1992

* cited by examiner

Primary Examiner—Harshad Patel

(57) ABSTRACT

A mass flowmeter operating by the Coriolis principle incorporates a straight Coriolis measuring tube through which flows a fluid or medium, at least one oscillator associated with and exciting the Coriolis measuring tube, and at least one detector associated with the Coriolis measuring tube for capturing the Coriolis forces and/or the Coriolis-force-induced oscillations. To provide a Coriolis flowmeter incorporating a Coriolis measuring tube which is subject to only minimal thermal expansion and, accordingly, to only minimal thermal stress, and which is resistant to chemicals, the Coriolis measuring tube is made of a ceramic material.

15 Claims, 2 Drawing Sheets

CORIOLIS MASS FLOWMETER WITH A CERAMIC MEASURING TUBE

BACKGROUND OF THE INVENTION

This invention relates to a mass flowmeter operating by the Coriolis principle and incorporating a straight Coriolis measuring tube through which flows a fluid or medium, at least one oscillator associated with and exciting the Coriolis measuring tube, and at least one detector associated with the Coriolis measuring tube for capturing the Coriolis force values and/or the Coriolis-force-induced oscillations.

The above description states that the mass flowmeter discussed incorporates, inter alia, at least one oscillator "associated" with the Coriolis measuring tube, and at least one detector "associated" with the Coriolis measuring tube. It is common for the oscillator(s) or, in any event, part of the oscillator(s) and the detector(s) or, in any event, part of the detector(s) to be directly connected to the Coriolis measuring tube. However, since that is not absolutely necessary, the term "associated" is being used instead of "connected".

For mass flowmeters operating by the Coriolis principle, one fundamentally distinguishes between those with an at least essentially straight Coriolis measuring tube and those with a looped Coriolis measuring tube. In the case of the mass flowmeters discussed here, one also distinguishes between designs employing only one Coriolis measuring tube and those with two Coriolis measuring tubes. Where two Coriolis measuring tubes are used, these may be connected in-line or positioned parallel to each other for the desired flow path.

In recent times, mass flowmeters with only one, essentially straight, Coriolis measuring tube have gained in popularity. Mass flowmeters operating by the Coriolis principle and equipped with one straight Coriolis measuring tube offer considerable advantages over mass flowmeters employing either two straight Coriolis measuring tubes or one looped Coriolis measuring tube. Compared to mass flowmeters with two straight Coriolis measuring tubes, their main advantage is that they obviate the need for a flow divider and a flow combiner, required in the case of mass flowmeters with two Coriolis measuring tubes. Compared to mass flowmeters employing one looped Coriolis measuring tube or two looped Coriolis measuring tubes, their main advantage lies in the fact that a straight Coriolis measuring tube is easier to manufacture than a looped Coriolis measuring tube, that in the case of a straight Coriolis measuring tube there is less of a pressure drop than in a looped Coriolis measuring tube, and that a straight Coriolis measuring tube can be cleaned more thoroughly than a looped Coriolis measuring tube.

Their advantages notwithstanding, mass flowmeters with only one straight Coriolis measuring tube also have drawbacks. For example, longitudinal expansion due to thermal effects can cause stress patterns in straight Coriolis tubes which, in extreme cases, may lead to mechanical damage to the Coriolis measuring tube, such as stress fissures and breaks. The reason is that in straight Coriolis measuring tubes, unlike for instance looped Coriolis measuring tubes, stress patterns caused by thermal expansion are not absorbed by a varied radius of curvature of the tube.

Another problem, albeit peculiar to all mass flowmeters operating by the Coriolis principle regardless of whether these mass flowmeters employ one Coriolis measuring tube or several Coriolis measuring tubes and regardless of whether the Coriolios measuring tubes are straight or looped, consists in the fact that, depending on the material used for the Coriolis measuring tube(s), chemical substances which would tend to corrode that material cannot be measured in the Coriolis mass flowmeter concerned. This might possibly impose severe limitations on the range of applications of the individual Coriolis mass flowmeter, necessitating the use of a different type of Coriolis mass flowmeter, meaning the replacement of the built-in Coriolis mass flowmeter.

SUMMARY OF THE INVENTION

In view of the above, it is the objective of this invention to provide a mass flowmeter, operating by the Coriolis principle, with one Coriolis measuring tube which displays only minor thermal expansion and corresponding stress patterns while at the same time offering high chemical resistance to corrosive substances.

The mass flowmeter according to this invention which solves the above-mentioned problem is characterized in that the Coriolis measuring tube consist of a ceramic material. A Coriolis measuring tube made from a ceramic material offers the advantage of permitting operation in a very wide temperature range including very high temperatures, displaying only moderate thermal expansion throughout the said wide operational temperature range. At the same time, ceramic materials are not affected, or temperatures, displaying only moderate thermal expansion throughout the said wide operational temperature range. At the same time, ceramic materials are not affected, or barely so, by corrosive substances such as chloric gases or liquids, which opens up a broad spectrum of possible applications for the Coriolis flowmeter according to this invention.

It is basically possible to use virtually any ceramic material for the Coriolis measuring tube in the Coriolis-type mass flowmeter according to this invention. Particular preference, however, is given to ceramic materials with especially high chemical resistance and with a low thermal expansion coefficient. Preferably, then, the Coriolis measuring tube consists of zirconium oxide or aluminum oxide and, according to a particularly preferred embodiment of this invention which allows the use of the Coriolis mass flowmeter for virtually all chemical compounds save for hydrofluoric acid (HF), of zirconium-stabilized aluminum oxide containing in excess of 5% zirconium. As an alternative, the Coriolis measuring tube for the mass flowmeter according to this invention preferably uses nitride ceramics.

The mass flowmeter of this invention, operating by the Coriolis principle, can be structured along essentially any conventional mass flowmeter design employing a single straight Coriolis measuring tube. However, in a preferred embodiment of this invention, a design is used whereby the mass flowmeter is provided with an outer enclosure which features a flange permitting installation in a pipe system. It is particularly desirable in this case to decouple the Coriolis measuring tube from any longitudinal forces in the pipe system in which it is installed. Such decoupling is preferably obtainable by firmly attaching the two ends of the Coriolis measuring tube to the outer enclosure while dimensioning and positioning it in such fashion that the Coriolis measuring tube is slightly set back from the lateral surfaces of the Coriolis mass flowmeter so that, when installed in the pipe system, it does not make direct contact with the latter.

As an alternative, it is also possible to connect only one end of the Coriolis measuring tube to the outer enclosure, allowing the Coriolis measuring tube to be longitudinally moved in relation to the outer enclosure. This approach serves as well to decouple the Coriolis measuring tube from the pipe system with respect to longitudinal forces.

To keep the Coriolis measuring tube in its proper position despite its longitudinal movability, elastic mounts are provided between the faces of the Coriolis measuring tube and the flange of the pipe system in which the Coriolis mass flowmeter can be installed, preferably in the form of O-ring gaskets which serve as an elastic support for the end section of the Coriolis measuring tube that is movable relative to the outer enclosure. In terms of the problem of longitudinal forces which are present in the longitudinal direction of, and bear on, the Coriolis measuring tube, it should be stated that ceramic components offer a certain resistance to longitudinal pressure while longitudinal tractive forces can much more readily lead to problems, meaning damage to the ceramic component. In view of this fact, the measures described above are intended to essentially decouple the Coriolis measuring tube from the longitudinal tractive forces.

In a further, preferred design embodiment of the Coriolis mass flowmeter according to this invention, at least one end of the Coriolis measuring tube is equipped with a firmly attached ring element which preferably consists of metal or a plastic material and by way of which the Coriolis measuring tube is connected to the outer enclosure. A ring of this type can serve several purposes: For one, the ring facilitates the attachment of the outer enclosure to the ceramic Coriolis measuring tube. For another, the ring can serve as a locating guide and support for a gasket. In addition, the ring element that is firmly attached to one end of the Coriolis measuring tube can help neutralize stress patterns in the ceramic Coriolis measuring tube which are caused by thermal expansion of the ceramic Coriolis measuring tube. If the Coriolis measuring tube were directly and solidly connected to the outer enclosure of the Coriolis mass flowmeter, the strength and substantial rigidity of the outer enclosure would not permit any changes in length of the ceramic Coriolis measuring tube without at least some stress arising in the Coriolis measuring tube. But a ring element firmly connected to the end of the Coriolis measuring tube, by virtue of a certain degree of elasticity, allows for at least a small, thermally induced longitudinal movement of the Coriolis measuring tube, eliminating or at least minimizing thermal-expansion-related stress patterns in the latter. Of course, the ring element that is firmly attached to one end of the Coriolis measuring tube will permit only longitudinal shifts of the Coriolis measuring tube which do not affect the symmetry and corresponding measuring accuracy of the Coriolis mass flowmeter.

The ring element can be attached to the end of the ceramic Coriolis measuring tube in a variety of ways. Preferably, however, the ring is crimped or shrink-mounted onto the ceramic Coriolis measuring tube. If the ring is of metal, it may also be welded onto a metallized surface section of the ceramic Coriolis measuring tube.

A further, preferred invention embodiment provides for the ceramic Coriolis measuring tube according to this invention to be impervious to gas and liquids by means of a seal between the end faces of the Coriolis measuring tube and the corresponding end faces of the flanges of the pipe system in which the Coriolis mass flowmeter is installed. Most preferably, this seal separates the Coriolis measuring tube from both the outer enclosure and the pipe system in which the Coriolis mass flowmeter is to be used. Also, a seal of this type when provided in the Coriolis mass flowmeter serves the additional purpose of absorbing and compensating for any thermally induced longitudinal expansion of the ceramic Coriolis measuring tube or of the pipe system and any possibly resulting compressive force exerted on the ceramic Coriolis measuring tube, thus essentially preventing such thermal expansion from engendering stress patterns in the Coriolis measuring tube. Most preferably, therefore, the seal consists of rubber or a plastic material, preferably Viton® or Kalrez®.

According to a preferred further embodiment of this invention, the outer enclosure can be attached to the ends of the ceramic Coriolis measuring tube in simple, dependable and damage-free fashion by making the wall of the Coriolis measuring tube at least at one end thicker than in its mid-section. To ensure optimum oscillatory properties of the ceramic Coriolis measuring tube, the wall thickness in the mid-section of the ceramic Coriolis measuring tube is preferably less than 1 mm and is preferably about 0.7 mm.

In a preferred further development, an internal cylinder is attached to the ends of the Coriolis measuring tube in the mass flowmeter according to this invention. Here as well, it is desirable to attach the internal cylinder in an area of the ceramic Coriolis measuring tube in which the wall is thicker than in the mid-section whose wall thickness is reduced for optimal oscillation.

Finally, a preferred embodiment of the mass flowmeter according to this invention provides for the Coriolis measuring tube to be installable in the pipe system in such fashion that the Coriolis measuring tube is decoupled from the pipe system in terms of any bending force emanating from the pipe system and potentially affecting the Coriolis measuring tube. This can be accomplished, for instance, by providing at the ends of the Coriolis measuring tube an elastically deformable buffer ring between the Coriolis measuring tube and the outer enclosure which is elastically deformable in a direction which is essentially perpendicular to the longitudinal axis of the Coriolis measuring tube. Thus, any axial bending force of the pipe system that would be transferred to the mass flowmeter at an angle essentially perpendicular to the axis of the Coriolis measuring tube, while deforming the buffer ring, will for all practical purposes be absorbed without deforming the Coriolis measuring tube.

BRIEF DESCRIPTION OF THE DRAWINGS

There are numerous ways in which the mass flowmeter according to this invention can be configured and further enhanced. In this context, reference is made to the dependent claims and to the following description of preferred embodiments of this invention in conjunction with the drawings, in which:

DESCRIPTION OF THE PREFERRED EMBODIMENTS

Figure 1:
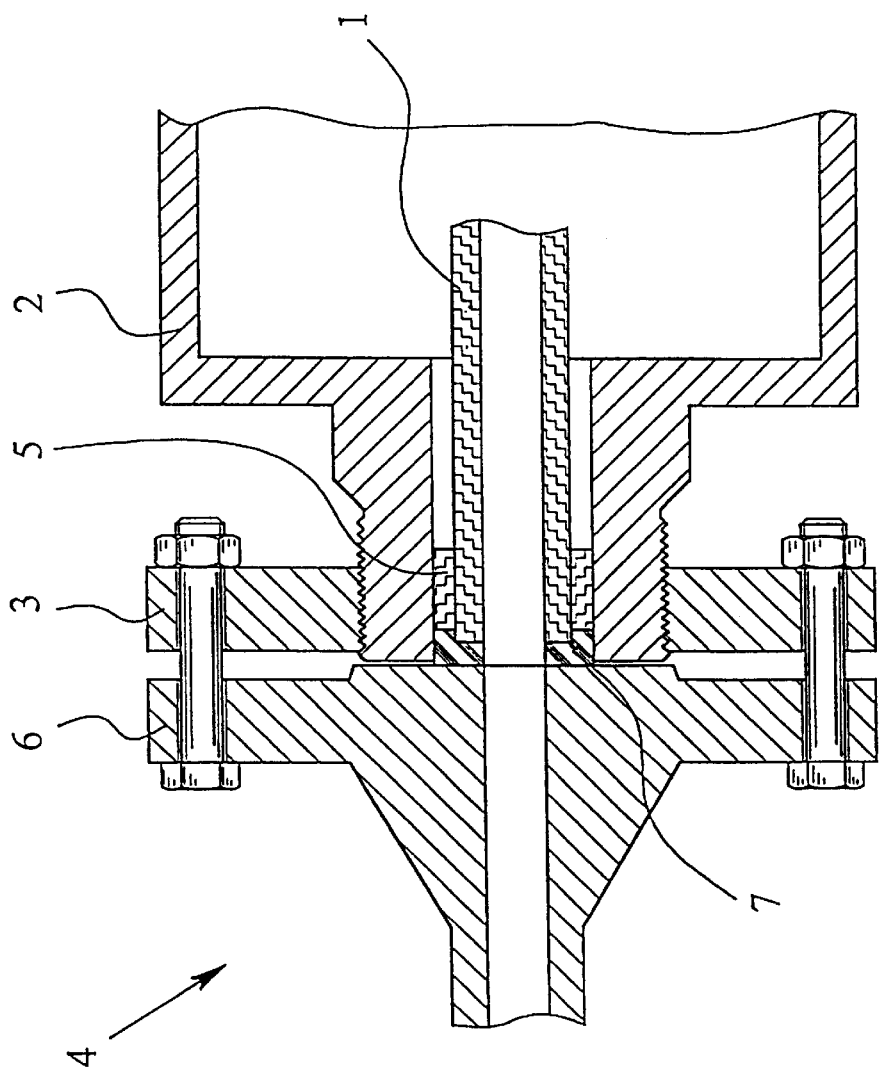
FIG. 1 is a schematic cross-sectional view of part of a Coriolis mass flowmeter according to a first preferred embodiment of this invention, installed in a pipe system.

The schematic cross-sectional illustration in FIG. 1 shows a Coriolis mass flowmeter according to a first preferred embodiment of this invention in its installed position, i.e. the junction between the Coriolis mass flowmeter and the pipe system in which it is used. The Coriolis measuring tube 1 according to the first preferred embodiment of this invention consists of zirconium-stabilized aluminum oxide containing in excess of 5% zirconium. This material permits the use of the Coriolis mass flowmeter for practically any chemical substance with the exception of hydrofluoric acid. The ceramic Coriolis measuring tube 1 is housed in a metallic outer enclosure 2 which also defines the outer dimensions of the Coriolis mass flowmeter. While in its mid-section the outer enclosure 2 has a diameter substantially larger than that of the Coriolis measuring tube 1, the two ends of the outer enclosure 2, of which only the left-hand end is shown in FIG. 1, are of a smaller diameter so as to facilitate the attachment of the enclosure 2 to the Coriolis measuring tube 1 and to enclosure 2, of which only the left-hand end is shown in FIG. 1, are of a smaller diameter so as to facilitate the attachment of the enclosure 2 to the Coriolis measuring tube 1 and to allow the attachment, positionally fixed in the longitudinal direction, of a flange 3 to the enclosure 2. The flange 3 serves for mounting the Coriolis mass flowmeter on the pipe system 4 in which the Coriolis mass flowmeter is to be used.

A metal ring 5 is located between the smaller-diameter end of the outer enclosure 2 and the Coriolis measuring tube 1 and, according to the first preferred embodiment of this invention as shown in FIG. 1, is crimp-mounted on the Coriolis measuring tube 1. A solid connection between the ring 5 and the enclosure 2 can be obtained by welding.

For mounting the Coriolis mass flowmeter to the pipe system 4, the pipe system 4 is provided with a flange 6 which attaches to the flange 3 of the Coriolis mass flowmeter. As can be seen in FIG. 1, the length of the Coriolis measuring tube 1 and its position within the outer enclosure 2 are such that the Coriolis measuring tube 1 will not protrude beyond the lateral ends or limits of the enclosure 2 but will in fact be slightly set back from these ends. According to the first preferred embodiment of the invention, this permits the positioning of a plastic seal 7 between the Coriolis measuring tube 1 and its crimp-mounted ring 5 and, respectively, the flange 6 of the pipe system 4. The seal 7 essentially performs these functions: it seals the Coriolis measuring tube 1 against both the outer enclosure 2 and the pipe system 4; it also serves as a buffer for the Coriolis measuring tube 1 against the longitudinal, axial forces which could potentially be transferred, for instance, from the pipe system 4 into the Coriolis mass flowmeter and thus to the Coriolis measuring tube 1.

If such longitudinal, axial forces were to directly bear on the end faces of the Coriolis measuring tube 1, the result could easily be a pattern of extreme mechanical stress, leading to breakage of the Coriolis measuring tube 1. This is prevented, however, by virtue of the design depicted in FIG. 1 and described above. Also, under normal installation conditions there is no direct contact between the flange 3 of the Coriolis mass flowmeter and the flange 6 of the pipe system 4 which contact would transmit compressive forces, i.e. the flange 3 of the Coriolis mass flowmeter does not itself touch the flange 6 of the pipe system 4, so that any compressive forces emanating from the pipe system 4 are effectively stopped and absorbed by the seal 7. Tractive forces originating in the pipe system 4 for instance when the flange 3 of the Coriolis mass flowmeter and the flange 6 of the pipe system are bolted together, are only transferred via the junction between the outer enclosure 2 and the Coriolis measuring tube 1, and thus primarily by way of the ring element 5 crimp-mounted on the Coriolis measuring tube 1. Since these forces come to bear on the Coriolis measuring tube 1 in a longitudinal direction but from the side, they cannot build up the same undesirable stress, often leading to breakage of the Coriolis measuring tube 1, that would be generated if the forces were to be longitudinally transferred directly to the end faces of the Coriolis measuring tube 1. Moreover, the ring 5, being of metal, has a certain measure of elasticity and at least to some degree provides an elastic connection between the outer enclosure 2 and the Coriolis measuring tube 1, counteracting the generation of such stress patterns in the Coriolis measuring tube 1 possibly caused by thermally induced longitudinal expansion.

As can be seen in FIG. 1, the flange 3 connects to the outer enclosure 2 via a threaded section. For added positional stability and the positive prevention of a longitudinal shifting between the enclosure 2 and the flange 3 of the Coriolis mass flowmeter, a weldment can be provided between the enclosure 2 and the flange 3.

According to the first preferred embodiment of this invention, a particularly secure positioning of the seal 7 is obtainable by providing on the latter an annular ledge along its radial perimeter which ledge protrudes between the Coriolis measuring tube 1 and the outer enclosure 2 all the way to the ring 5 that is crimp-mounted on the Coriolis measuring tube 1.

Figure 2:
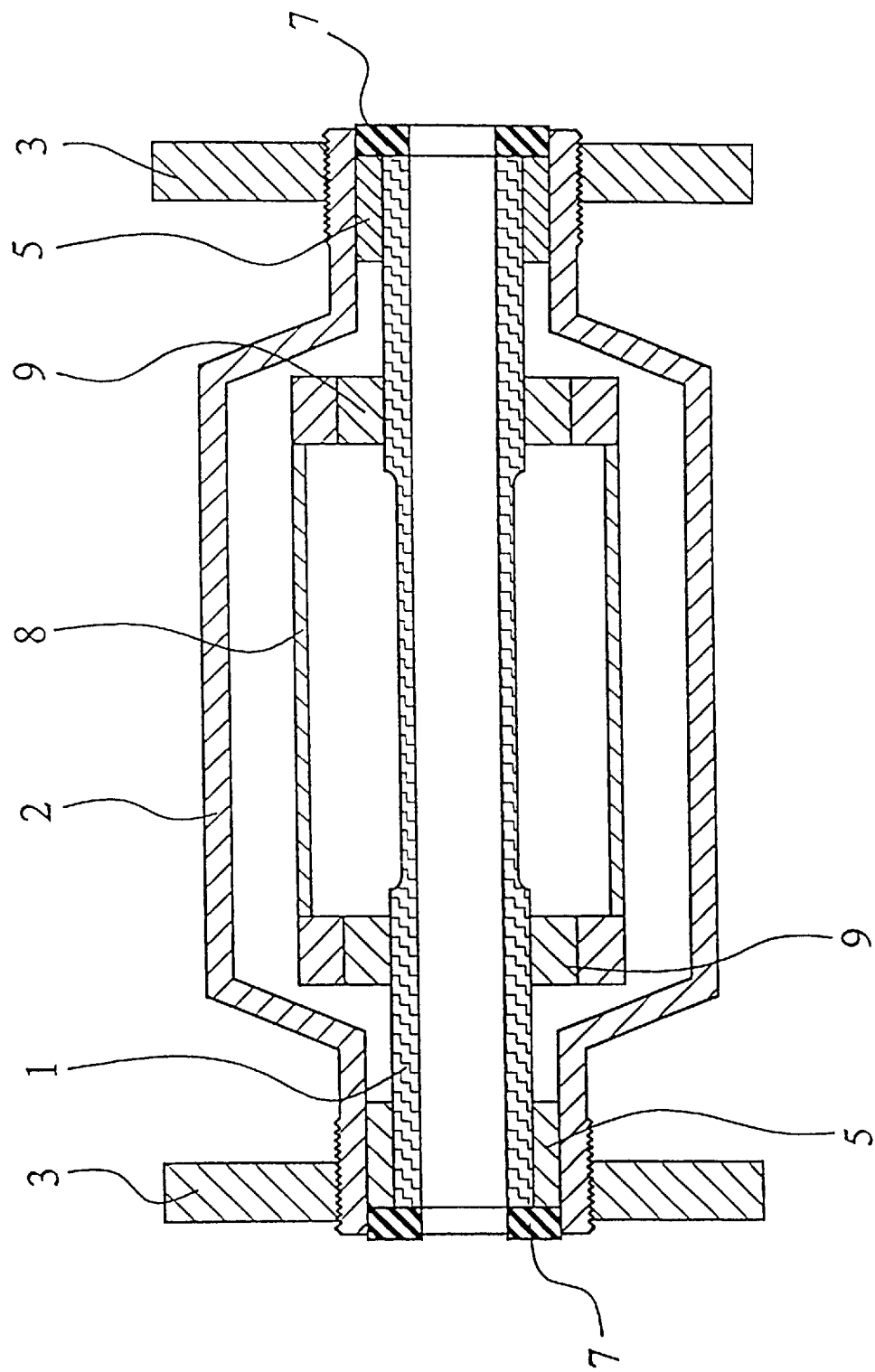
FIG. 2 is a schematic cross-sectional view of a Coriolis mass flowmeter according to a second preferred embodiment of this invention.

FIG. 2 is a schematic cross-sectional view of a Coriolis mass flowmeter according to a second preferred embodiment of this invention. In this second preferred embodiment of the invention, the wall is thicker at the two ends of the ceramic Coriolis measuring tube 1 than in the area of its mid-section. In this fashion, the ends at which the Coriolis measuring tube 1 is connected to the outer enclosure 2 offer the necessary wall thickness and ensure correspondingly high stability of the Coriolis measuring tube 1 while its midsection, which is subjected to an excitation oscillation and also registers the Coriolis oscillations of the flowing medium, offers good oscillatory properties. Apart from attaching the outer enclosure 2 by way of the ring element 5 crimp-mounted on the Coriolis measuring tube 1 at its thick-walled end section, an internal cylinder 8 is attached to the said end section with the aid of annular wedges 9. The above statement relative to the stability and strength of the Coriolis measuring tube 1 also applies in conjunction with the mounting of the internal cylinder 8 using annular wedges 9.

Typically mounted inside the internal cylinder 8 but not illustrated in FIG. 2 for simplicity's sake, are an oscillator exciting the Coriolis measuring tube 1 and at least one detector capturing the Coriolis forces and/or the oscillations derived from the Coriolis forces.

As in the first preferred embodiment of this invention described above, the ceramic Coriolis measuring tube 1 in the second preferred embodiment of the invention shown in FIG. 2 is again so dimensioned and positioned that on both sides of the Coriolis mass flowmeter, it is set back from the ends of the Coriolis mass flowmeter, defined by the outer enclosure 2. This allows for the installation of a seal 7 which, as explained above, serves to stop and buffer the longitudinal forces that would otherwise bear on the end faces of the Coriolis measuring tube 1. In the second preferred embodiment of the invention, the seal 7 is an O-ring gasket consisting of Kalrez® and simply inserted at the end section of the Coriolis mass flowmeter between the Coriolis measuring tube 1 and, not shown in FIG. 2, the flange of the pipe system in which the Coriolis mass flowmeter is installed.

As has been stated further above, the Coriolis measuring tube in the mass flowmeter according to this invention preferably consists of zirconium-stabilized aluminum oxide containing in excess of 5% zirconium. In terms of the properties of the ceramic material used for the Coriolis measuring tube, the following parameters apply as individual alternatives or cumulatively in any combination:

a) The thermal expansion coefficient should be between that of steel and that of titanium.

b) The density should be higher than that of titanium but lower than that of steel.

c) The bending strength should be somewhat less than that of titanium but greater than that of steel.

d) The coefficient of elasticity should be roughly that of steel.

e) The compression resistance should be very high relative to that of titanium and steel.

Specifically, a ceramic material having the following individual or combined properties is recommended:

a) Density: 5.7 g/cm$^3$ b) Hardness (Knoop, 100 g): 17,000 N/mm$^2$ c) Compression resistance: 3,000 N/mm$^2$ d) Bending strength: 450 N/mm$^2$ e) Coefficient of elasticity: 360,000 N/mm$^2$ f) Coefficient of thermal expansion: 10$^{-5}$/K.

What is claimed is:

1. A mass flowmeter operating by the Coriolis principle and incorporating a straight Coriolis measuring tube having a mid-section and end sections with end faces and through which flows a fluid or medium, at least one oscillator associated with and exciting the Coriolis measuring tube, at least one detector associated with the Coriolis measuring tube for capturing the Coriolis force values or the Coriolis-force-induced oscillations, and an outer enclosure provided with flanges wherein the mass flowmeter can be installed in a pipe system with the aid of said flanges, the Coriolis measuring tube consisting of a ceramic material, and at least on one end section, the Coriolis measuring tube being provided with a metal ring fly attached to the Coriolis measuring tube and being connected to the outer enclosure by way of said metal ring welded to the outer enclosure.

2. The mass flowmeter as in claim 1, wherein the Coriolis measuring tube consists of zirconium oxide, a nitride ceramic or aluminum oxide.

3. The mass flowmeter as in claim 1, wherein the Coriolis measuring tube consists of zirconium-stabilized aluminum oxide containing in excess of 5% zirconium.

4. The mass flowmeter as in claim 1, wherein the metal ring is crimp- or shrink-mounted.

5. The mass flowmeter as in one of the claims 1 to 4, wherein a seal is provided between the end faces of the Coriolis measuring tube and a corresponding flange of the pipe system.

6. The mass flowmeter as in claim 5, wherein the seal separates the Coriolis measuring tube from both the outer enclosure and the pipe system.

7. The mass flowmeter as in claim 5, wherein the seal is provided with an annular, peripheral ledge which protrudes between the Coriolis measuring tube and the outer enclosure up to the metal ring welded on the Coriolis measuring tube.

8. A mass flowmeter operating by the Coriolis principle and incorporating a straight Coriolis measuring tube having a mid-section and two end sections with end faces and through which flows a fluid or medium, at least one oscillator associated with and exciting the Coriolis measuring tube and at least one detector associated with the Coriolis measuring tube for capturing the Coriolis force values or the Coriolis-force-induced oscillations, wherein the Coriolis measuring tube consists of a ceramic material and has greater wall thickness in at least one of said end sections than in said mid-section.

9. The mass flowmeter as in claim 8, wherein the wall thickness in the mid-section of the Coriolis measuring tube is less than 1 mm.

10. The mass flowmeter as in claim 9, wherein the wall thickness in the mid-section of the Coriolis measuring tube is about 0.7 mm.

11. The mass flowmeter as in one of the claims 8 to 10, wherein the Coriolis measuring tube consists of zirconium oxide, a nitride ceramic or aluminum oxide.

12. The mass flowmeter as in one of the claims 8 to 10, wherein the Coriolis measuring tube consists of zirconiun-stabilized aluminum oxide containing in excess of 5% zirconium.

13. A mass flowmeter operating by the Coriolis principle and incorporating a straight Coriolis measuring tube having a mid-section and two end sections with end faces and through which flows a fluid or medium, at least one oscillator associated with and exciting the Coriolis measuring tube, at least one detector associated with the Coriolis measuring tube for capturing the Coriolis force values or the Coriolis-force-induced oscillations, and an outer enclosure provided with flanges wherein the mass flowmeter can be installed in a pipe system with the aid of said flanges, the Coriolis measuring tube consisting of a ceramic material, and the end sections of the Coriolis measuring tube being each provided with an elastically deformable buffer ring mounted between the Coriolis measuring tube and the outer enclosure and which is elastically deformable in a direction essentially perpendicular to the longitudinal axis of the Coriolis measuring tube such that the Coriolis measuring tube can be installed in the pipe system in such fashion that the Coriolis tube is decoupled from bending forces emanating from the pipe system and bearing on the Coriolis measuring tube.

14. The mass flowmeter as in claim 13, wherein the Coriolis measuring tube consists of zirconium oxide, a nitride ceramic or aluminum oxide.

15. The mass flowmeter as in claim 13, wherein the Coriolis measuring tube consists of zirconium-stabilized aluminum oxide containing in excess of 5% zirconium.

* * * * *